(12) United States Patent
Alexandropoulos

(10) Patent No.: US 10,284,994 B2
(45) Date of Patent: May 7, 2019

(54) DIRECTIONAL SPEAKER SYSTEM AND METHOD

(71) Applicant: STMicroelectronics (Research & Development) Limited, Marlow (GB)

(72) Inventor: Alexios Alexandropoulos, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

(21) Appl. No.: 15/468,711

(22) Filed: Mar. 24, 2017

(65) Prior Publication Data
US 2018/0091916 A1    Mar. 29, 2018

(30) Foreign Application Priority Data
Sep. 26, 2016   (EP) ..................... 16190647

(51) Int. Cl.
| | |
|---|---|
| H04R 3/00 | (2006.01) |
| H04S 7/00 | (2006.01) |
| H04S 3/00 | (2006.01) |
| G01S 17/36 | (2006.01) |
| G01S 17/66 | (2006.01) |
| H04R 3/12 | (2006.01) |
| H04R 29/00 | (2006.01) |
| G01S 17/48 | (2006.01) |
| G01S 17/89 | (2006.01) |

(52) U.S. Cl.
CPC ............. *H04S 7/303* (2013.01); *G01S 17/36* (2013.01); *G01S 17/66* (2013.01); *H04R 3/12* (2013.01); *H04R 29/002* (2013.01); *H04S 3/002* (2013.01); *G01S 17/48* (2013.01); *G01S 17/89* (2013.01); *H04R 29/008* (2013.01); *H04R 2203/12* (2013.01); *H04R 2499/15* (2013.01)

(58) Field of Classification Search
CPC ........... H04S 7/303; H04S 3/002; H04R 3/12; H04R 29/002; H04R 29/008; H04R 2499/15; H04R 2203/12; H04R 3/002; G01S 17/36; G01S 17/66; G01S 17/89; G01S 17/48
USPC ............................ 381/77, 81–83, 300, 306
See application file for complete search history.

(56) References Cited

U.S. PATENT DOCUMENTS

| | | | |
|---|---|---|---|
| 6,859,417 B1 | 2/2005 | Houg | |
| 2005/0207589 A1* | 9/2005 | Biegelsen | ............. G01S 15/325 381/77 |
| 2011/0069841 A1* | 3/2011 | Angeloff | ................. H03G 3/30 381/17 |
| 2011/0081032 A1* | 4/2011 | Soulodre | ................ H04S 1/002 381/300 |
| 2013/0077082 A1 | 3/2013 | Mellot | |

(Continued)

FOREIGN PATENT DOCUMENTS

WO    2014138134 A2    9/2014

*Primary Examiner* — Disler Paul
(74) *Attorney, Agent, or Firm* — Slater Matsil, LLP

(57) ABSTRACT

A directional loudspeaker system has a loudspeaker arrangement configured to generate N audio signals. A time-of-flight sensor arrangement is configured to detect a location of a user. A controller is configured to use information from the time-of-flight sensor arrangement about the location of the user to control the delay such that the N audio signals constructively interfere at the location of the user.

24 Claims, 10 Drawing Sheets

(56) References Cited

U.S. PATENT DOCUMENTS

| | | | |
|---|---|---|---|
| 2014/0003622 A1* | 1/2014 | Ikizyan | H04R 3/00 |
| | | | 381/95 |
| 2014/0270187 A1 | 9/2014 | Hall et al. | |
| 2015/0177369 A1* | 6/2015 | Kostamovaara | G01S 17/107 |
| | | | 356/5.08 |
| 2016/0033644 A1 | 2/2016 | Moore | |
| 2017/0341183 A1* | 11/2017 | Buller | B23K 26/342 |

* cited by examiner

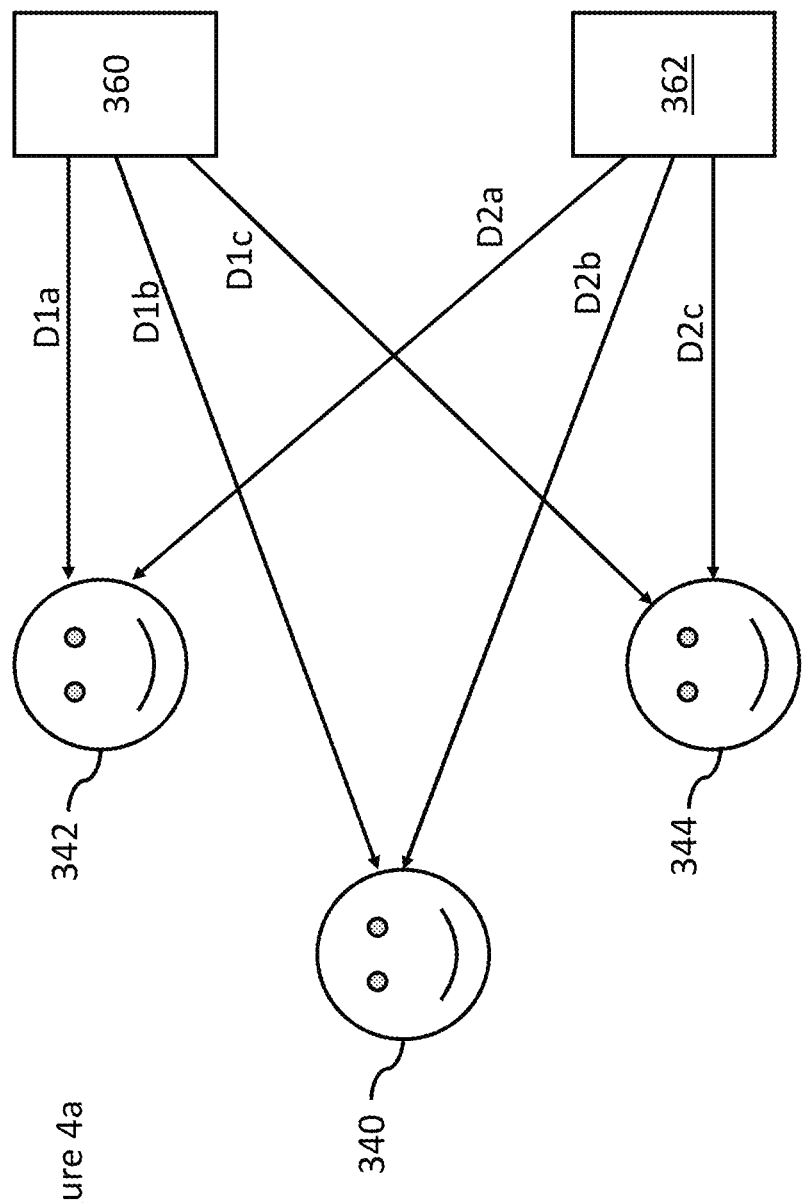

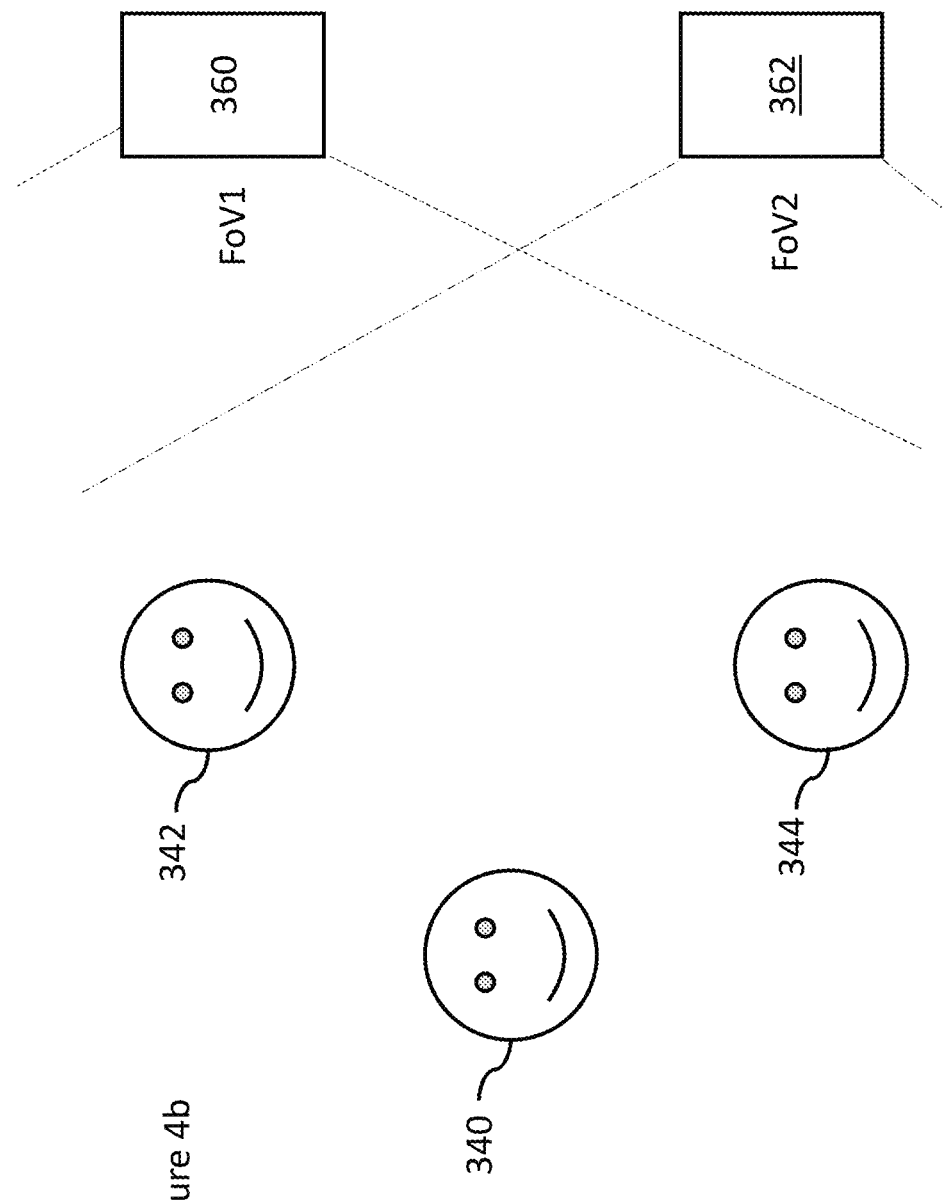

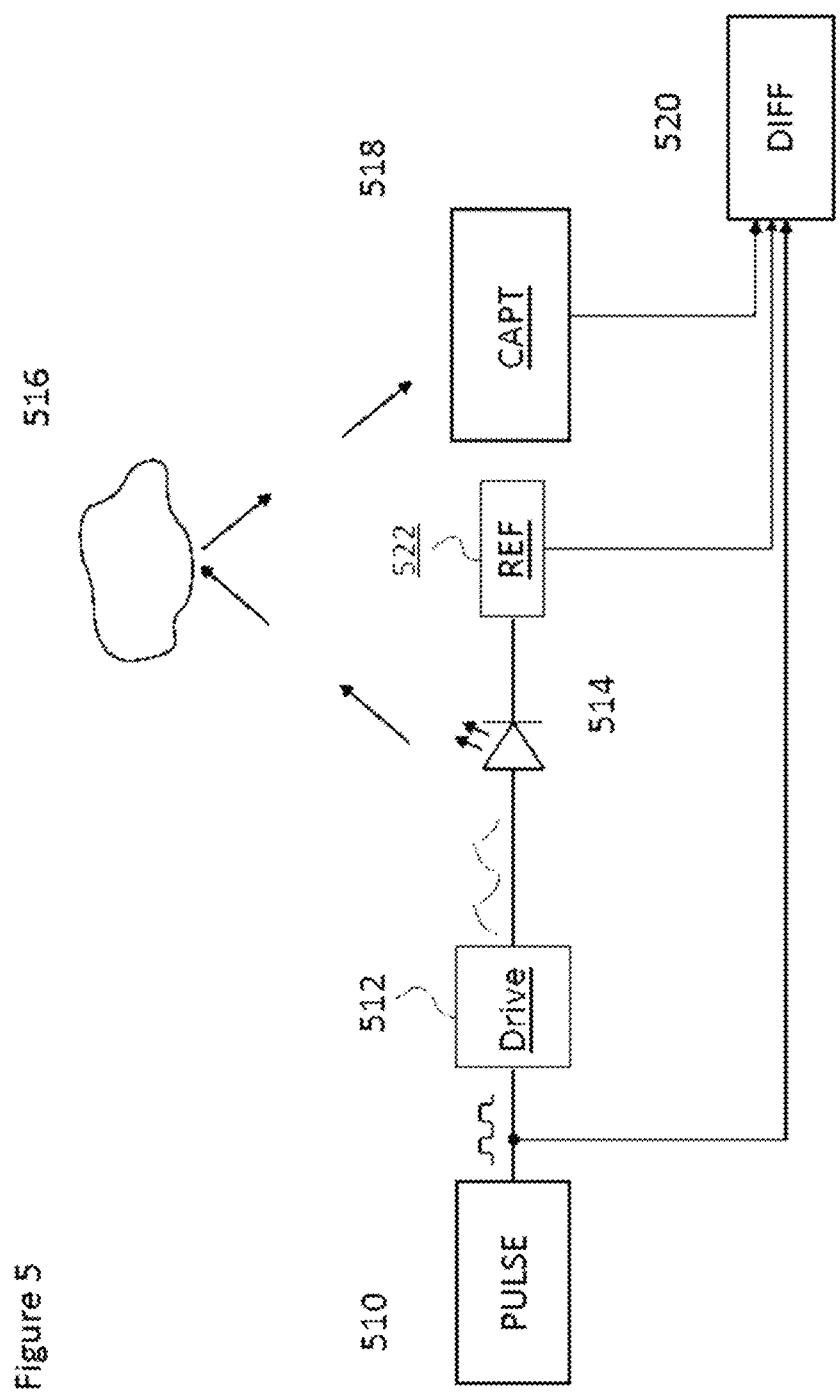

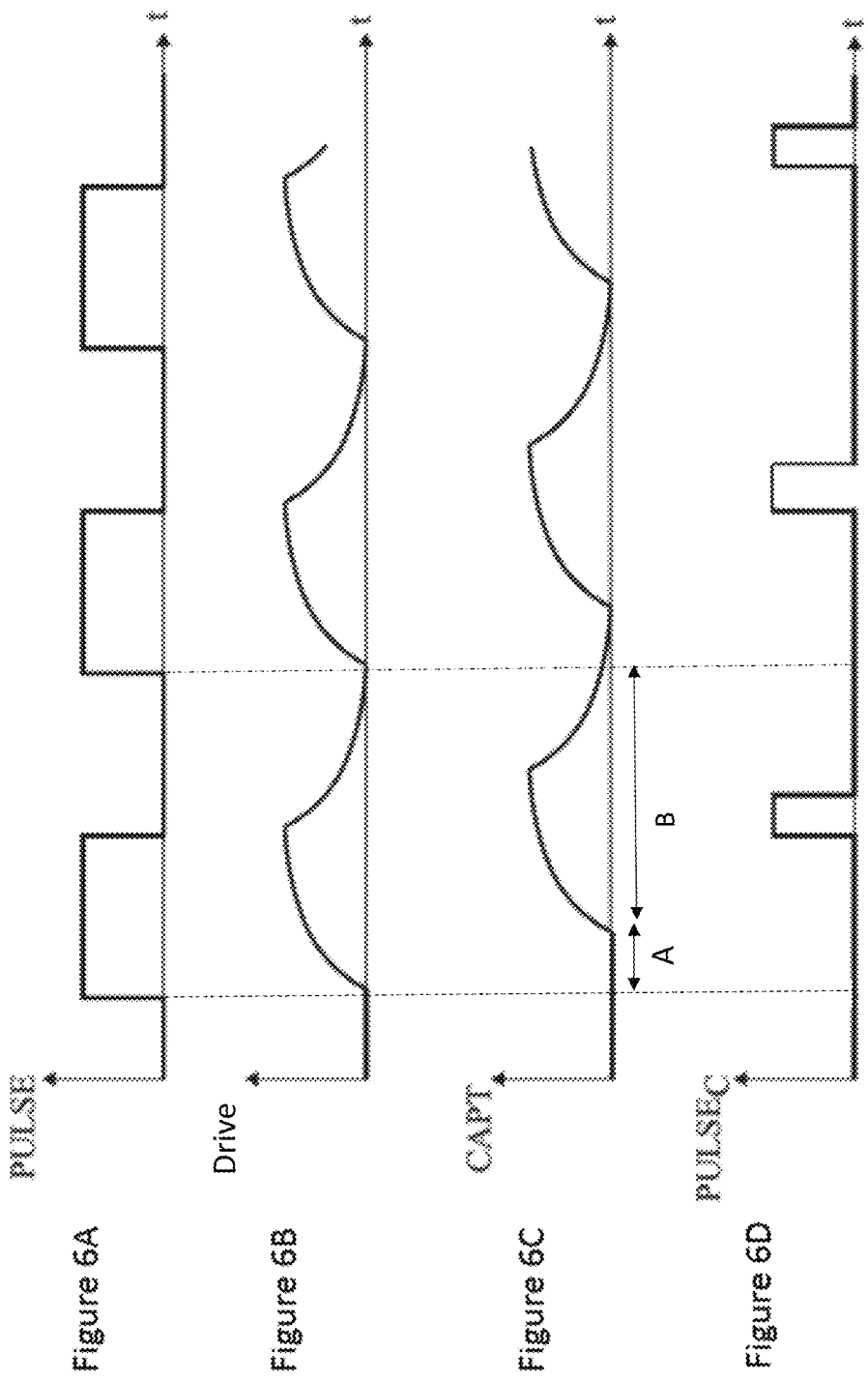

DIRECTIONAL SPEAKER SYSTEM AND METHOD

CROSS-REFERENCE TO RELATED APPLICATIONS

This application claims priority to European Patent Application No. 16190647.4, filed on Sep. 26, 2016, which application is hereby incorporated herein by reference.

TECHNICAL FIELD

Some embodiments relate to a directional speaker system and method, and a sensor for use in such a system.

BACKGROUND

Directional interference speakers have been used in exhibitions, galleries, museums, etc., to provide targeted audio information that is audible only to the person standing directly in front of the exhibit. For example, when a user moves into a particular position, the user will be able to hear the targeted audio content.

These arrangements are set up for particular positions of a user in advance and are not particularly flexible.

SUMMARY

According to an aspect, there is provided a directional loudspeaker system that includes a loudspeaker arrangement, which is configured to generate N audio signals (N being an integer equal or greater than 2). The N audio signals are such that at least one audio signal has a delay with respect to at least one other. A time of flight sensor arrangement is configured to detect a location of a user and a controller is configured to use information from the time of flight sensor arrangement about the location of the user to control the delay such that the N audio signals constructively interfere at the location of the user.

The loudspeaker arrangement may comprise a plurality of loudspeakers spatially separated.

The time of flight sensor arrangement may comprise a plurality of time of flight sensors.

Each of the time of flight sensors comprises a single photon avalanche diode (SPAD).

The time of flight sensor arrangement may comprise a time of flight sensor provided at each loudspeaker.

Each of the time of flight sensors may comprise a field of view, the directional loudspeaker system may have an active area in which the N audio signals constructively interfere, wherein at least a part of each field of view of each time of flight overlies the active area.

The controller may be configured to use information from the time of flight sensor arrangement to track movement of the user and to correspondingly control the delay such that the N audio signals constructively interfere at the location of the user as the user moves.

A content of the audio signals may be dependent on a position of the user.

N may be such that each of the N audio signals is individually sub-audible.

The directional loudspeaker system may comprise a display arrangement configured to display video content associated with the audio signals.

According to another aspect, a directional loudspeaker method comprises generating N audio signals, wherein the N audio signals are such that at least one audio signal has a delay with respect to at least one other and where N is an integer equal or greater than 2. A location of a user is detected using a time-of-flight sensor arrangement. Information from the time-of-flight sensor arrangement about the location of the user is used to control the delay such that the N audio signals constructively interfere at the location of the user.

The method may comprise generating the N audio signals using a plurality of loudspeakers which are spatially separated.

The time-of-flight sensor arrangement may comprise a plurality of time-of-flight sensors.

Each of the time-of-flight sensors may comprise a SPAD.

The time-of-flight sensor arrangement may comprises a time-of-flight sensor provided at each loudspeaker of a loudspeaker arrangement.

Each of the time-of-flight sensors may comprise a field-of-view and there may be an active area in which the N audio signals constructively interfere, wherein at least a part of each field-of-view of each time-of-flight sensor overlies the active area.

The method may comprise using information from the time-of-flight sensor arrangement to track movement of the user and to correspondingly control the delay such that the N audio signals constructively interfere at the location of the user as the user moves.

The method may comprise selecting a content of the audio signals dependent on a position of the user.

N may be such that each of the N audio signals is individually sub-audible.

The method may comprise displaying video content associated with the audio signals.

BRIEF DESCRIPTION OF THE DRAWINGS

Reference is made by way of example only to the accompanying drawings in which:

FIG. 4*a* shows schematically targeting different audio to different users;

FIG. 4*b* shows schematically respective fields of view associated with the sensors on respective speakers;

FIG. 5 illustrates principle of the "time-of-flight" method for determining the distance to an object;

FIGS. 6A to 6D are timing diagrams illustrating results obtained by means of the device of FIG. 5, as well the operation of "SPADs";

DETAILED DESCRIPTION OF ILLUSTRATIVE EMBODIMENTS

There are various known technologies which are able to provide localized sound. One example of such a technology uses a loud speaker array. In this regard, reference is made to FIG. 1 which shows a simplified example. The loud speaker array comprises a first loud speaker 10 and a second loud speaker 12 separated by distance D3. It should be appreciated that N loud speakers may be used in some systems where N is an integer of 2 or more.

Figure 1:
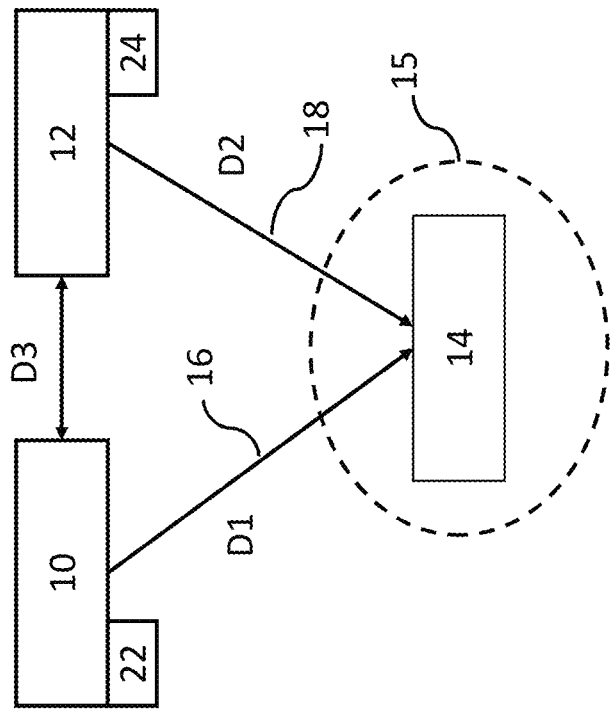
FIG. 1 shows schematically a directional speaker system.

In the example shown in FIG. 1, a user 14 is arranged to listen to the sound provided by the loud speakers. In the arrangement show in FIG. 1, there is an area referenced 15 where the sound can be heard. With directional speaker arrays, the sound may not be heard outside the area referenced 15.

Figure 2:
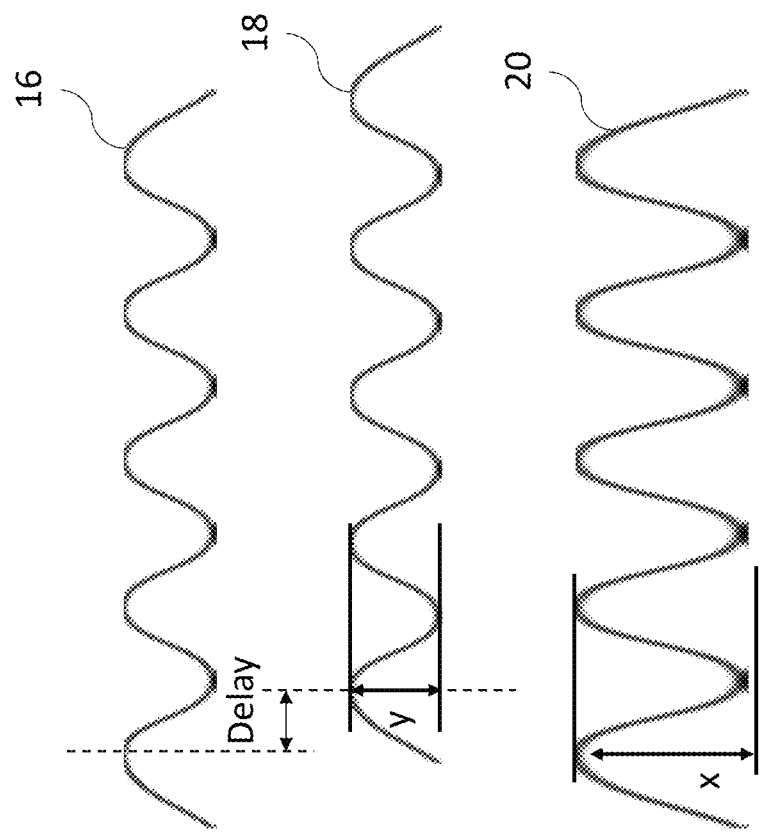
FIG. 2 schematically shows audio waves in the arrangement of FIG. 1.

Each of the loud speakers is configured to output a low amplitude sound wave. This will be in the audible spectrum and at the frequency at which the sound is to be heard by a user. The sound wave output by the first speaker 10 is referenced 16 and the sound wave output by the second speaker is referenced 18. These sound waves are schematically shown in FIG. 2.

In some embodiments, each sound wave has a low amplitude (y) such that on its own it is difficult to hear. However, the sound waves are controlled such that they constructively interfere at the position of the user 14. In this regard, reference is made to FIG. 2 which shows the resulting constructively interfering waveform 20 which has the same frequency as the individual wave forms but a larger amplitude (x). In some embodiments, the required amplitude of each of the individual sound waves may be dependent on the required amplitude (which defines the volume) at the user and the number N of arrays.

Because each of the individual sound waves has a relatively low amplitude, the individual sound waves are generally not audible and will hence not be heard unless the individual sound waves have constructively interfered. In this way the sound can be heard in area 15 but not outside that area.

According to the principle of wave superposition, constructive interference of the sound waves will occur when a given point of a first sound wave arrives at the listener at the same time that the corresponding point of the second sound wave arrives. To achieve this, one of the first and second sound waves is output by the respective loud speaker with a delay with respect to the output of the other of the first and second sound waves by the respective loud speaker.

In systems such as shown in FIG. 1, the loud speakers will output the same signal but there will be a delay between the signals. The delay will be dependent on the focus of the loudspeaker array, represented by the position of the listener. The delay will thus depend on the distance D1 between the first loudspeaker 10 and the listener 14 and the distance D2 between the second loudspeaker 12 and the listener 14.

Assume the sound signal from the first loudspeaker 10 is emitted at t=0 and the sound signal from the second loudspeaker 12 is emitted at a delayed time $t=t_d$. Then the phase Φ1 of the sound wave of the first loudspeaker 10 at the point of the listener, and the phase Φ2 of the sound wave of the second loudspeaker 12 at the point of the same listener, will be:

$$\Phi 1 = 2\pi f t_1 \qquad \text{(Eq. 1)}$$

$$\Phi 2 = 2\pi f(t_2 + t_d) \qquad \text{(Eq. 2)}$$

where f is the common frequency of the sound waves, $t_1$ and $t_2$ are the time it takes for the sound waves from loudspeaker 10 and 12, respectively, to reach the listener 14.

In order for constructive interference to occur at the point of the listener, the two sound waves should reach the listener simultaneously, namely the absolute phase difference between the two sound waves should be 2π radians at the point of the listener:

$$|\Phi 2 - \Phi 1| = 2\pi \qquad \text{(Eq. 3)}$$

Substituting Eq. 1 and Eq. 2 into Eq. 3 we obtain:

$$|2\pi f(t_2 + t_d) - 2\pi f t_1| = 2\pi$$

Solving for $t_d$ we obtain:

$$t_d = \frac{1}{f} - |t_1 - t_2| = \frac{1}{f} - \frac{|D1 - D2|}{v} \qquad \text{(Eq. 4)}$$

where v is the speed of sound in air. Thus, Equation 4 provides the required delay between the two sound waves, in order for constructive interference to occur at distance D1 and D2 from loudspeaker 10 and 12, respectively.

In embodiments, each loud speaker is provided with a respective time-of-flight (ToF) sensor 22 and 24. Using these sensors to measure the distance (D1 and D2 respectively) to the listener allows the delay of each speaker to be adjusted dynamically in real-time, using Eq. 4.

This may provide the advantage that the audible point (focal point) where the listener is located need not be fixed but determined by the position of the user itself. Therefore, the listener does not have to stand or be at a specific point to hear the sound, but rather the system senses the listener and dynamically adjusts the delay on each speaker so that the focal point matches his/her position.

In this regard, reference is made to FIG. 4a which schematically shows three listeners 340, 342 and 344 located at different locations. In the example shown in FIG. 4, first and second speakers 360 and 362 are provided with respective time-of-flight sensors. The location of the time-of-flight sensor is considered to be the location of the respective speaker. The time-of-flight sensors are used to determine for each user the respective distances D1 and D2. Thus, for the first user 342, the respective distances D1a and D2a are determined. Likewise, for the second user 340, the respective distances D1b and D2b are determined. Finally, for the third user 344, the respective distances D1c and D2c are also determined. Based on this information, the loudspeakers are able to output three separate audio signals. Each of the audio signals is controlled so as to constructively interfere at the respective location associated with the user for which the given audio signal is intended.

Using the Time-of-Flight (ToF) sensors, the values of D1 and D2 may be continuously measured to determine the value of the delay to control the output of the respective sound waves by the respective loud speakers.

In some embodiments, the system may use the time-of-flight sensors to make periodic measurements so that if the listener moves around, the system can sense their position and adjust the delay on each loudspeaker, allowing the audio focal point to track the listener. In such case, Eq. 4 takes the time-dependent form:

$$t_d(t) = \frac{1}{f} - \frac{|D1(t) - D2(t)|}{v} \qquad \text{(Eq. 5)}$$

Figure 4C:
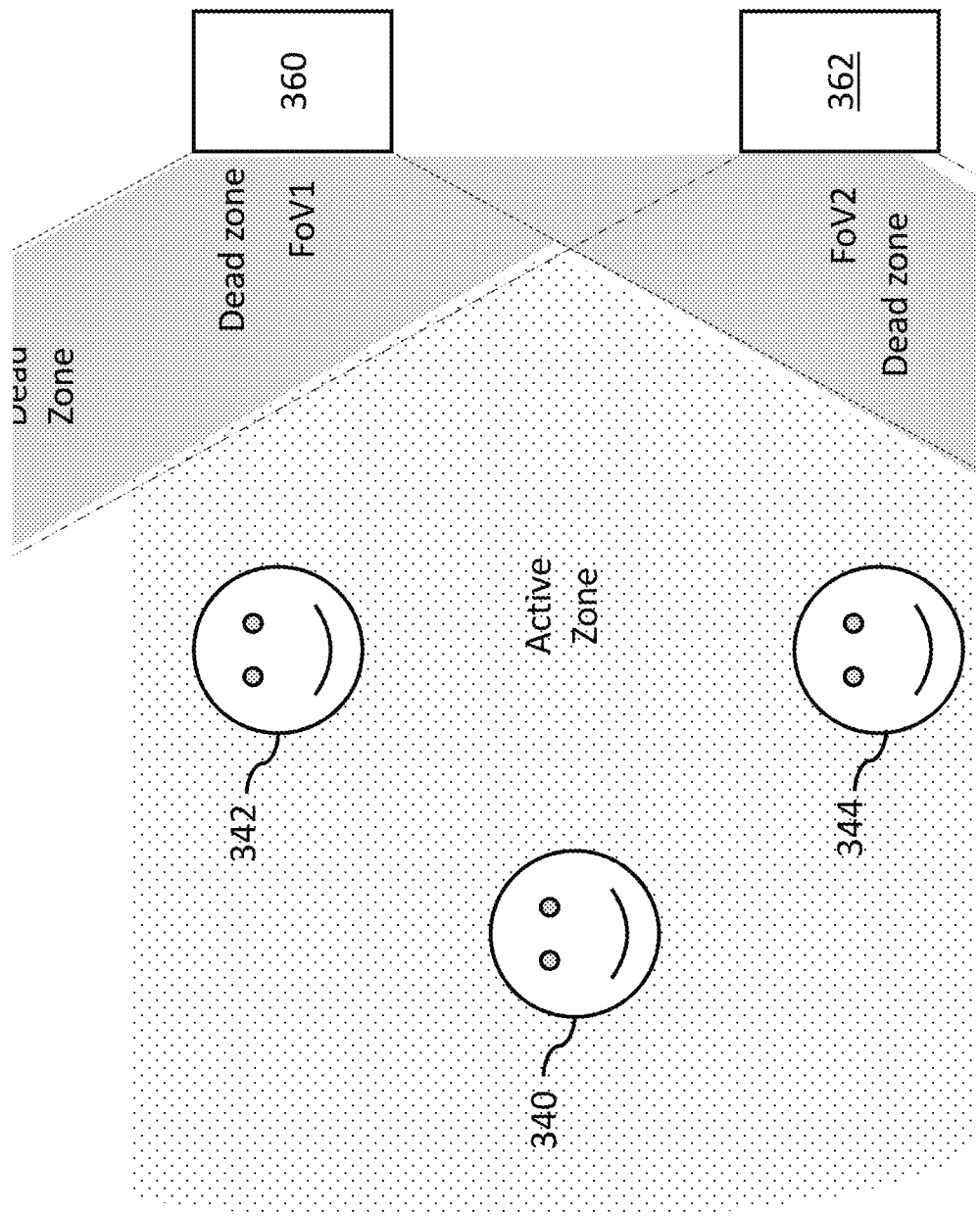
FIG. 4*c* shows schematically shows the active zone associated with the arrangement of FIG. 4*a;*

In order for the time-of-flight sensors to be able to measure distances D1 and D2, their field-of-view are configured to be relatively wide enough and overlapping with each other. This is illustrated in FIG. 4b where FoV1 and FoV2 denotes the fields-of-view of the time-of-flight sensors embedded in the respective loudspeakers. Regions of space outside the sensors' common field-of-view overlapping area (active zone) would be a dead-zone for the system. This is illustrated in FIG. 4c. Within such a dead-zone, one or more sensors will not be able to return a measured distance to a listener. By altering the sensors' field-of-view along with the relative speaker position, dead-zones can be eliminated or expanded, as required for a specific application.

The field-of-view of a time-of-flight sensor can be controlled using suitable diffractive lenses in front of the laser emitting and photosensitive elements.

Figure 3:
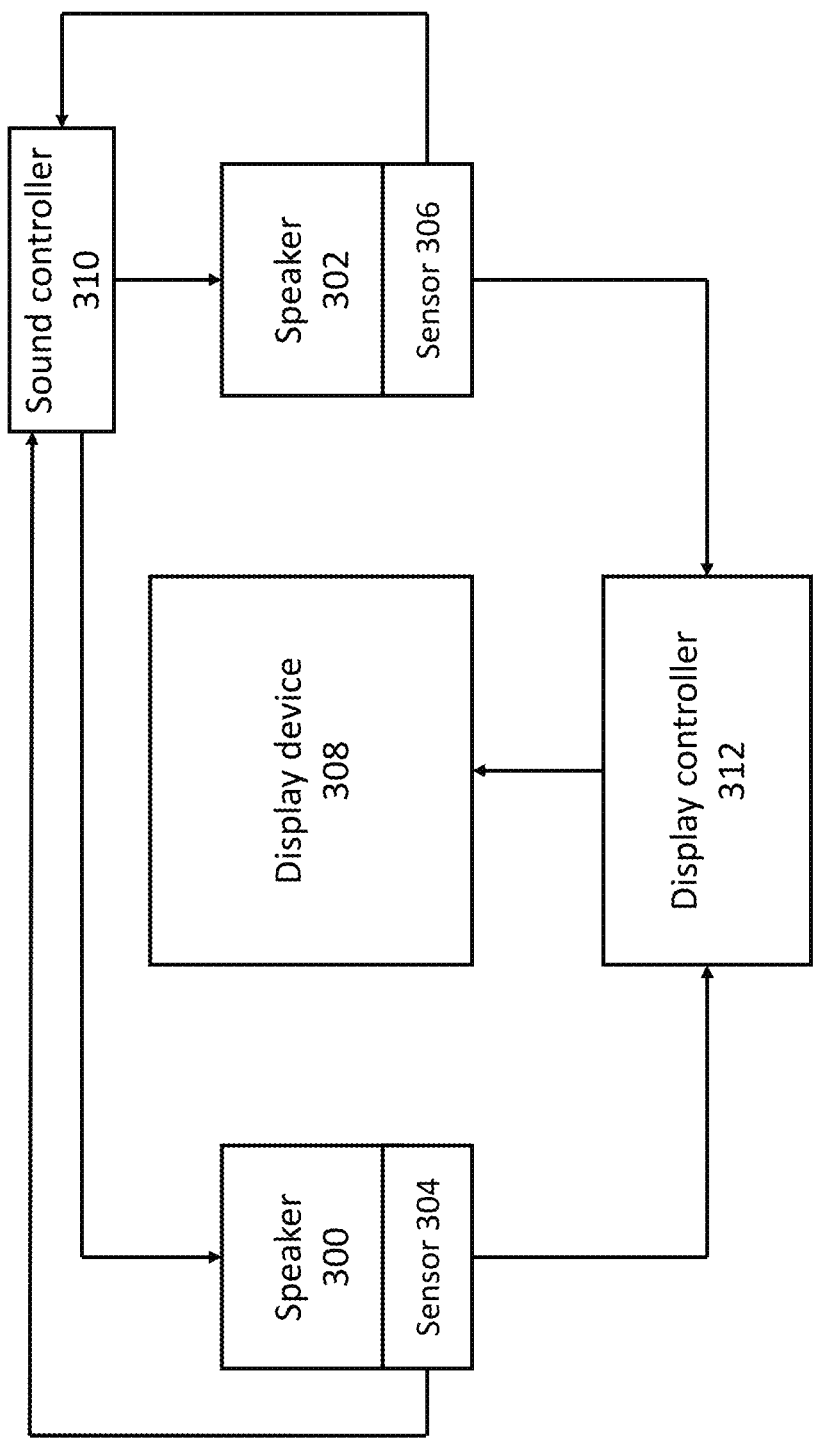
FIG. 3 shows schematically shows a directional audio visual system.

Reference is made to FIG. 3 which shows another system in which embodiments can be used. In the embodiment shown in FIG. 3, a first speaker 300 and a second speaker 302 provided. These speakers are directional speakers, as described previously in relation to, for example FIG. 1. Each of these speakers 300 is provided with a time-of-flight sensor 304 and 306 respectively. In the arrangement shown in FIG. 3, visual content is additionally provided by a display device 308. In some embodiments, the display device may be a screen or the like. The display may be configured to have different visual content on different parts of the display.

Accordingly, using the speakers, different users, positioned in different places, may receive different visual and/or audio content. The display device 308 may be configured to provide differing visual content associated with the respective audio content. In the example shown in FIG. 3, a sound controller 310 is provided which is configured to, for example, control the delay of the audio signals output by the respective speakers to ensure that the audio signals have the appropriate audio focal point. In this regard, the delay for one or more of the audio signals is determined by the sound controller in dependence on the outputs from the respective time-of-flight sensors 304 and 306.

The display device 308 may be controlled by a display controller 312. The display controller may receive input from the time-of-flight sensors 304 and 306 and use this information to determine which visual content is positioned in which location on the display device.

This may be used in conjunction for example with the arrangement of FIGS. 4a-c. It should be appreciated that in some embodiments, the users may only receive audio content and other embodiments that audio content may be associated with visual content which is displayed in the display. In some embodiments, one or more users will receive only audio content and one or more users will receive audio and visual content.

The examples above have had two speakers. It should be appreciated that other embodiments may have more than two speakers. The more speakers, the smaller the amplitude of the individual audio signals. In some embodiments, it may be possible for each audio signal to be sub audible to human hearing.

One method for sensing distance is called "Time-of-Flight" (ToF). This method comprises sending a light signal towards an object and measuring the time taken by the signal to travel to the object and back. The calculation of the time taken by the signal for this travel may be obtained by measuring the phase shift between the signal coming out of the light source and the signal reflected from the object and detected by a light sensor. Knowing this phase shift and the speed of light enables the determination of the distance to the object. This may be used to determine the distance D1 and D2 discussed above.

Single photon avalanche diodes (SPAD) may be used as a detector of reflected light. In general an array of SPADs is provided as a sensor in order to detect a reflected light pulse. A photon may generate a carrier in the SPAD through the photoelectric effect. The photo generated carrier may trigger an avalanche current in one or more of the SPADs in an SPAD array. The avalanche current may signal an event, namely that a photon of light has been detected.

FIG. 5 illustrates the general principle of a "Time-of-flight" method. In FIG. 5, a generator 510 (PULSE) provides a periodic electric signal, for example, square-shaped. This signal is passed in to a driver 512, which powers a light source 514. An example of a light source 514 may be a light-emitting diode, or any known lighting device, for example, a laser diode. The signal coming out of light source 514 is transmitted towards an object 516 (e.g., the listener) and is reflected by this object. The reflected light signal is detected by a light sensor 518. The signal (CAPT), on sensor 518, is thus phase-shifted from the signal provided by the generator by an angle which correlates with the distance to object 516.

Calculation block 520 ("DIFF") receive the signals generated by generator 510 and by sensor 518 and calculates the phase shift between these signals to obtain the distance to object 516. In some embodiments, a reference sensor is used. The reference sensor 522 (REF) will be positioned so as to receive the light emitted by the light source, and is close to the light source. The distance to the object may be determined using the timing difference between the reference sensor receiving the light from the light source and the sensor 518 receiving the light from the reflected object.

FIGS. 6A to 6D are timing diagrams illustrating the operation of a circuit such as that in FIG. 5. FIG. 6A illustrates a periodic signal "PULSE" capable of being provided by the generator 510 of FIG. 5. FIG. 6B illustrates the output from the driver. FIG. 6C illustrates the signal CAPT received by sensor 518. Due to interactions with the outside and to the components forming sensor 518, the signal output from the driver and that received by this sensor has, in this example, variations in the form of capacitor charges and discharges. The signal on sensor 518 is phase-shifted from the signal coming out of generator 510 by a delay A. In some embodiments, the timing of the SPAD uses the delay A to determine distance. In other embodiments, if the pulses are regular, the timing of the SPAD may be used B, where B is the time between the captured return signal and the next pulse. This is shown in FIG. 6C.

The sensor 518 may integrate one or several photo detection elements enabling the detection of the signal received after reflection on the object 516. Such elements may be rapid charge transfer photodiodes. Single-photon avalanche diodes, or "SPADs", also called Geiger mode avalanche photodiodes, may also be used. These devices have a reverse biased p-n junction in which a photo-generated carrier can trigger an avalanche current due to an impact ionization mechanism. SPADs may be designed to operate with a reverse bias voltage well above the breakdown voltage.

FIG. 6D illustrates the signal (PULSEC) generated by sensor 518, in the case where this sensor contains such a SPAD.

SPADs operate as follows. At an initial time, the diode is biased to a voltage larger than its breakdown voltage. The reception of a photon in the diode junction area starts an avalanche in the diode, which creates an electric pulse. The diode is then biased back to a voltage smaller than the breakdown voltage, so that the SPAD reacts again to the reception of a photon.

As illustrated in FIG. 6D, if SPADs receive a light signal such as described in relation to FIG. 6C, the diode avalanche time may vary with respect to this signal. The graph of the number of pulses versus time reflects the power-time profile of the light received by the SPAD. Thus, in the case illustrated in FIGS. 6A to 6D, on a large number of acquisitions, the graph of the pulse transmission by the SPAD substantially follows the curve of FIG. 6C.

To obtain information relative to the distance to an object, a circuit and a method using data obtained from a device will now be described. Ranging is the method of obtaining a distance measurement.

Figure 7:
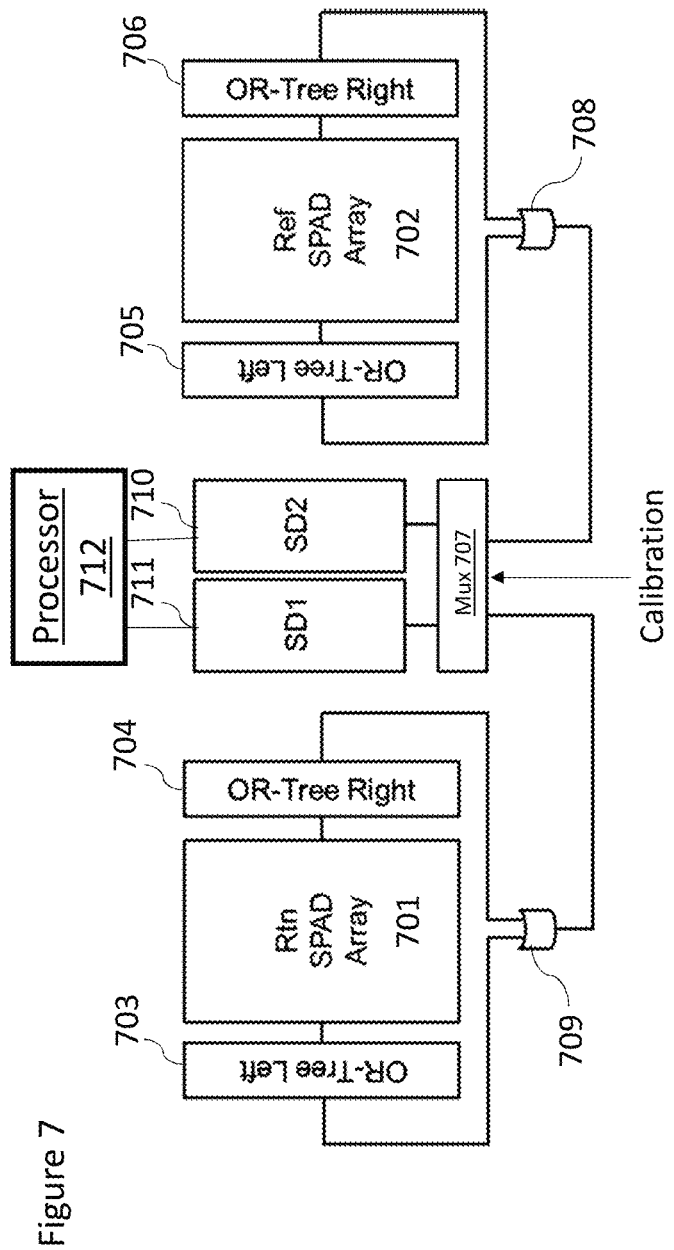
FIG. 7 shows a block diagram of SPAD array arrangement.

Reference is now made to FIG. 7 which schematically shows an overview of an embodiment of a time-of-flight sensor. The arrangement comprises a first SPAD array 701 and a second SPAD array 702. Each SPAD array comprises a plurality of SPAD devices.

The first SPAD array 701 provides a plurality of outputs. By way of example, each SPAD of the array may provide an output. The respective outputs of the first SPAD array 701 are provided to a left side OR-tree 703 if the SPAD is on the left side of the first SPAD array or a right side OR-tree 704 if the SPAD is on the right side of the first SPAD array.

Likewise the second SPAD array 702 provides a plurality of outputs. Again, by way of example, each SPAD of the array may provide an output. The respective outputs of the second SPAD array 702 are provided to a left side OR-tree 705 if the SPAD is on the left side of the second SPAD array or a right side OR-tree 706 if the SPAD is on the right side of the second SPAD array.

The outputs from the left side OR-tree and the right side OR-tree for each array are combined by a respective OR element 709 and 708 to provide inputs to a multiplexer 707. In some embodiments, a single OR-tree may be provided for each array.

In some embodiments, a calibration input may also be provided to the multiplexer 707, although this is not shown. The output from the multiplexer are provided to first and second data processing arrangements 711 and 710. The first data processing arrangement 711 processes the data received from the first array and the second data processing arrangement 710 processes the data received from the second array. These arrangements may provide digital data which is passed to a processor 712 which may generate histogram data as discussed later and determine distance information therefrom.

In some embodiments, the reference array (the second array) will receive the light pulse as it is output at the device whilst the return array (the first array) will receive the light pulse reflected from the object.

In other embodiments, the second array is also used as a detection array.

In some embodiments, each sensor may be configured to determine a distance to a user. In other embodiments, each sensor may also be used to track the distance to a user as the user moves. In that embodiment, both arrays may be used to capture light reflected from an object, i.e. the user.

The two SPAD arrays and associated circuitry can be used to provide a stereoscopic perspective. Each of the arrays is able to capture a reflected beam and the interspatial distance may be used to provide a stereoscopic perspective.

Having two images of the same target may improve the detection and tracking of the target.

With a single transmitter/receiver arrangement, crossing targets at a fixed height give rise to changes in range measurements, and reflectance intensity. If the target is not uniformly flat then additional artifacts will result in a poorer ranging or distance calculation. A dual channel such as used in embodiments may improve the ranging capability in such a situation by using triangulation techniques. This is because the information is available from each of the arrays which can be used to detect more accurately the position, and not just its distance, of an object and hence track the object when it moves.

Histogramming techniques may permit depth mapping and target declutter using binning techniques to differentiate targets at different distances.

Figure 8:
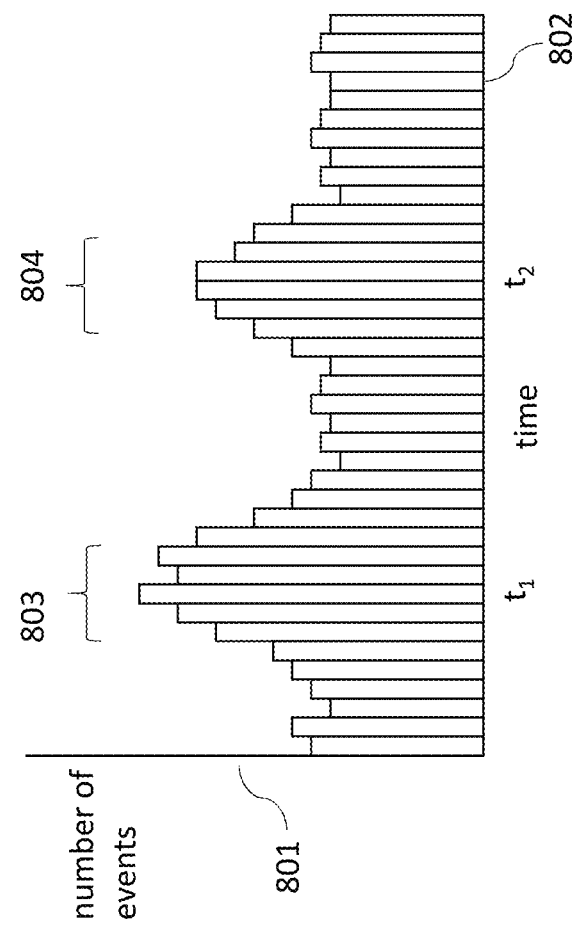
FIG. 8 shows an example of a histogram produced in some embodiments.

FIG. 8 show an example histogram of light detected at one of the arrays with the number of events detected against time and for example show the detecting of a position of two objects. This can be used to detect the position of more or less than two objects. As can be seen from FIG. 8 there is a first peak 803 of detected events at time t1 and a second peak 804 of events at time t2. These first and second peaks may be the result of the reflection of the emitted light from respective first and second objects.

It will be appreciated that the time t1 and the time t2 may be determined by a clock of the device. The time may be determined based on a timer that starts counting when a pulse of light is triggered and records when the events occur (the incidence of the reflected light). Information relating to a detected event and a time at which the event was detected may be passed to a time to digital converter which may provide a digital representation of the information. It may be appreciated that the time to digital converter (TDC) may receive an indication of an event from the sensor array and provide a digital indication of the event along with a time stamp. For example, the TDC may be further coupled to a clock. The processor may receive these digital indications and build up a histogram depicting the number of events that have occurred at each time bin.

The processor may receive information that an event has occurred and a time at which the event has occurred. The processor may gather this information and use it to generate a histogram. It will be appreciated that in order to gather enough information to generate a histogram a plurality of light pulses may be emitted in the determination of a distance from the remote object. Event information may be detected for one or more of these plurality of pulses and the information may be combined by the processor to generate a histogram.

It will be appreciated that the information in the histogram of FIG. 8 may represent the events detected over a number of pulses.

It will be appreciated that the processor may trigger the start of a pulse. The time at which the pulse was triggered may be known, however due to driver reaction time and PVT (process, voltage, temperature) variations, the time at which the pulse is emitted is not accurately known. For each pulse, the time of the event 802 may be considered to be the time between the pulse being triggered and the event being detected. Thus event information for each of a plurality of pulses may include an indication of an event and a time corresponding to a time period of between the triggering of a pulse the event occurring.

It will be appreciated that the number of events detected at the times surrounding t1 and t2 may not be null. This is because other incidences of light may occur onto the sensor. For example, light from other sources may be incident on the sensor and/or light having a longer reflection path may fall onto the sensor.

It will be appreciated that event data is gathered for each pulse period and then event data from all the pulse periods are combined. The emitter may emit a number of pulses during a detection period and data is gathered for each of the pulse periods in the detection period. For each pulse period time and event information comprising an indication of any event and an associated time (corresponding to a period of time between that pulse being triggered and an event detected) will be gathered for the events occurring during the pulse period. The time and event information for each pulse period will be combined to generate the histogram.

Once the time and event information is gathered from the pulses in the detection period and the histogram is generated, the distance between the remote objects and the device may be determined from the time of the first peak 803 and the second peak 804. An average or mean time at which the first events occurred and an average or mean time at which the second events occurred may be determined and used to determine distance of the second object. It will be appreciated that different methods to detect the peaks may be used. For example a highest number of events per time may be used to detect a peak or an average number of events per time period may be used.

Some embodiments have been described in the context of using a histogramming technique. However, this is only one way of analyzing the outputs of the arrays. In other embodiments, different techniques may be used to analyze the outputs from the arrays.

It will be appreciated that in some embodiments, the array may be a single photon avalanche diode array. It will be appreciated that a photon of light (as part of the light emitted from the emitter) may trigger an avalanche current in a SPAD and thus cause an output of an indication of an event.

In the foregoing a light emitter has been described. It will be appreciated that in some embodiments, the emitter may be a vertical surface cavity emitting laser (VSCEL) and may be driven by a VSCEL driver. However it will be appreciated that this is by way of example only and other suitable emitters may be used.

In some embodiments, the use of Time-Of-Flight (ToF) sensors on each speaker to measure the distance to the viewer would allow the audio system to adjust the delay accordingly eliminating the need for the viewer to stand directly in front of a directional loudspeaker. A ToF-enabled directional speaker may be used in any suitable application. For example, such speakers could be used in a home theatre system to eliminate the need for using headphones when the listener wants private audio (e.g., not to disturb other people) and/or the need to sit directly in the middle of the distance between speakers.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. A directional loudspeaker system comprising:
a plurality of loudspeakers configured to generate N directional audio signals, wherein the N directional audio signals are such that at least one directional audio signal of the N directional audio signals has a delay with respect to at least one other directional audio signal, wherein N is an integer equal or greater than 2, wherein the N directional audio signals comprise sound waves having a common frequency in an audible frequency spectrum, wherein the plurality of loudspeakers are configured to focus the N directional audio signals at a first location, and wherein the plurality of loudspeakers are spatially separated from one another;
a time-of-flight sensor arrangement comprising a plurality of optical time-of-flight sensors, wherein each of the plurality of loudspeakers includes one of the plurality of optical time-of-flight sensors, wherein the plurality of optical time-of-flight sensors is configured to measure a plurality of distance values comprising respective distance values measured from the first location to each of the plurality of loudspeakers; and
a controller configured to use the plurality of distance values from the time-of-flight sensor arrangement to determine N−1 delays by subtracting a result of dividing a difference between pairs of distance values by a speed of sound from an inverse of the common frequency such that the N directional audio signals constructively interfere at the first location, wherein the constructive interference generates an audio signal having an amplitude greater than the N directional audio signals and the common frequency.

2. The directional loudspeaker system according to claim 1, wherein each of the optical time-of-flight sensors comprises a single photon avalanche diode (SPAD).

3. The directional loudspeaker system according to claim 1, wherein each of the optical time-of-flight sensors comprises a field-of-view, the directional loudspeaker system having an active area in which the N directional audio signals constructively interfere, wherein at least a part of each field-of-view of each time-of-flight sensor overlies the active area.

4. The directional loudspeaker system according to claim 1, wherein the controller is configured to use information from the time-of-flight sensor arrangement to track movement of a moving object and to correspondingly control the delay such that the N directional audio signals constructively interfere at the first location as the moving object moves.

5. The directional loudspeaker system according to claim 4, wherein a content of the N directional audio signals is dependent on a position of the moving object.

6. The directional loudspeaker system according to claim 1, wherein N is such that each of the N directional audio signals is individually sub-audible.

7. The directional loudspeaker system according to claim 1, further comprising a display arrangement configured to display video content associated with the N directional audio signals.

8. The directional loudspeaker system according to claim 1, wherein the N is equal to two, wherein one of the plurality of loudspeakers is spatially separated from another of the plurality of loudspeakers.

9. A directional loudspeaker method comprising:
determining a plurality of distance values comprising respective distance values measured from a first location to each of a plurality of optical time-of-flight sensors using a time-of-flight sensor arrangement comprising the plurality of optical time-of-flight sensors, wherein each of the plurality of optical time-of-flight sensors is configured to measure a time-of-flight information between itself and the first location;
using the plurality of distance values from the time-of-flight sensor arrangement, for each of N directional audio signals comprising sound waves having a common frequency, determining N−1 delays by subtracting a result of dividing a difference between pairs of distance values by a speed of sound from an inverse of the common frequency, wherein N is an integer equal or greater than 2;

transmitting the N directional audio signals having a common frequency in an audible frequency spectrum towards the first location, wherein the N directional audio signals are such that each audio directional signal of the N directional audio signals has one of the N−1 delays with respect to at least one other, and wherein each of the N transmitted directional audio signals are transmitted from spatially separated locations; and at the first location, the delay causing generation of an audio signal having an amplitude greater than the N directional audio signals and the common frequency.

10. The method according to claim 9, wherein transmitting the N directional audio signals comprises generating the N directional audio signals using a plurality of loudspeakers that are spatially separated.

11. The method according to claim 9, further comprising using information from the time-of-flight sensor arrangement to track movement of a moving object and to correspondingly control the delay such that the N directional audio signals constructively interfere at the first location of as the moving object moves.

12. The method according to claim 9, wherein N is such that each of the N directional audio signals is individually sub-audible.

13. The method according to claim 9, further comprising displaying video content associated with the N directional audio signals.

14. The method according to claim 9, wherein a content of the N directional audio signals is dependent on a position of a moving object.

15. The method according to claim 9, wherein the N is equal to two, wherein transmitting the N directional audio signals comprises transmitting from a first speaker location and a second speaker location that are spatially separated from each other.

16. A directional loudspeaker system comprising:
a first directional loudspeaker configured to directionally transmit a first sub-audible sound wave in an audible frequency spectrum from a first location towards a second location;
a second directional loudspeaker configured to directionally transmit a second sub-audible sound wave in the audible frequency spectrum from a third location towards the second location, wherein the first location and the third location are spatially separated;
a first optical time-of-flight sensor configured to determine a first distance between the first location and the second location;
a second optical time-of-flight sensor configured to determine a second distance between the third location and the second location, the first distance being different from the second distance; and
a controller configured to generate a phase difference between the first sub-audible sound wave and the second sub-audible sound wave that are being emitted so that the first sub-audible sound wave and the second sub-audible sound wave constructively interfere at the second location using a difference between the first distance and the second distance, wherein the constructive interference generates an audio signal having an amplitude greater than the first sub-audible sound wave and the second sub-audible sound wave.

17. The directional loudspeaker system according to in claim 16, wherein each of the first and the second optical time-of-flight sensors comprises a field-of-view, the directional loudspeaker system having an active area in which the first and the second sub-audible sound waves constructively interfere, wherein at least a part of each field-of-view of each of the first and the second optical time-of-flight sensors overlies the active area.

18. The directional loudspeaker system according to claim 16, wherein the controller is configured to use information from the first and the second optical time-of-flight sensors to track movement of a moving object and to correspondingly control a phase difference between the first and the second sub-audible sound waves such that the first and the second sub-audible sound waves constructively interfere at the first location as the moving object moves.

19. The directional loudspeaker system according to claim 16, further comprising a display configured to display video content associated with the first and the second sub-audible sound waves.

20. The directional loudspeaker system according to claim 16, wherein each of the first and the second optical time-of-flight sensors comprises a single photon avalanche diode (SPAD).

21. The directional loudspeaker system according to in claim 16, wherein the controller is configured to generate the phase difference so that the first sub-audible sound wave and the second sub-audible sound wave are configured to reach the first location with no phase difference.

22. A method of transmitting audio, the method comprising:
determining a first distance between a first speaker position and a first hearing position using a first optical sensor at the first speaker position;
determining a second distance between the first speaker position and a second hearing position using the first optical sensor at the first speaker position;
determining a third distance between a second speaker position and the first hearing position using a second optical sensor at the second speaker position;
determining a fourth distance between the second speaker position and the second hearing position using the second optical sensor at the second speaker position;
directionally transmitting a first sub-audible audio signal from a first speaker location to a first hearing position;
directionally transmitting a second sub-audible audio signal from the first speaker location to a second hearing position;
based on a difference between the first and the third distances, directionally transmitting a third sub-audible audio signal from a second speaker location to the first hearing position, wherein the first sub-audible audio signal and the third sub-audible audio signal have a first frequency, wherein the first sub-audible audio signal and the third sub-audible audio signal constructively interfere at the first hearing position, wherein the constructive interference at the first hearing position generates a first audible audio signal having an amplitude greater than the first and the third sub-audible audio signals and the first frequency; and
based on a difference between the second and the fourth distances, directionally transmitting a fourth sub-audible audio signal from the second speaker location to the second hearing position, wherein the second sub-audible audio signal and the fourth sub-audible audio signal have a second frequency, wherein the second sub-audible audio signal and the fourth sub-audible audio signal constructively interfere at the second hearing position wherein the constructive interference at the second hearing position generates a second audible audio signal having an amplitude greater than the second and the fourth sub-audible audio signals and the second frequency.

23. The method according to claim 22, wherein the first, the second, the third, and the fourth sub-audible audio signals are simultaneously transmitted.

24. The method according to claim 22, wherein the first sub-audible audio signal and the third sub-audible audio signal have a first phase difference so as reach the first hearing position at the same time with no phase difference, and wherein the second sub-audible audio signal and the fourth sub-audible audio signal have a second phase difference so as to reach the second hearing position at the same time with no phase difference.

* * * * *